United States Patent [19]

Takala

[11] 4,263,084
[45] Apr. 21, 1981

[54] THERMOPLASTIC WELDING

[75] Inventor: Seppo I. Takala, Verwoerdburg, South Africa

[73] Assignee: Impala Plastics (Pty) Limited, Pretoria, South Africa

[21] Appl. No.: 160,908

[22] Filed: Jun. 18, 1980

[30] Foreign Application Priority Data

Jun. 22, 1979 [ZA] South Africa ............ 79/3109

[51] Int. Cl.³ ............................................. B29C 19/00
[52] U.S. Cl. ................................... 156/503; 156/158; 156/304.2; 156/499; 269/43
[58] Field of Search ............. 156/304.2, 503, 157–158, 156/499, 583.1; 228/44.5; 29/282, 463, 464; 425/108; 269/43, 44

[56] References Cited

U.S. PATENT DOCUMENTS

| 3,729,360 | 4/1973 | McElroy | 156/499 |
| 3,789,493 | 2/1974 | Drovince | 29/282 |
| 4,008,118 | 2/1977 | Wesebaum et al. | 156/499 |

FOREIGN PATENT DOCUMENTS 1479185  12/1970  Fed. Rep. of Germany ........ 156/304.2

Primary Examiner—David A. Simmons
Attorney, Agent, or Firm—Omri M. Behr

[57] ABSTRACT

A machine for welding thermoplastic components which has a pair of clamps for holding two thermoplastic parts to be welded, one mounted on a slide, and action piston for moving the slidably mounted clamp towards the other clamp so as to press thermoplastic components held in the clamps against each other for welding, the action piston being located eccentrically of the clamps and a second, reaction piston located in dimension so as to provide a reaction force couple which nullifies the force couple arising from the eccentricity of the main action piston. This is the advantage that the force couple is not applied to the clamp which is slidably mounted and to components associated with the slide and provides assurance of an evenly distributed pressure between the two thermoplastic components to be welded therefore assuring better quality welds. The use of the two pistons moreover enables location of them only to one side of the clamps thereby leaving regions for good accessability to the clamps and to the thermoplastic components located in them.

5 Claims, 6 Drawing Figures

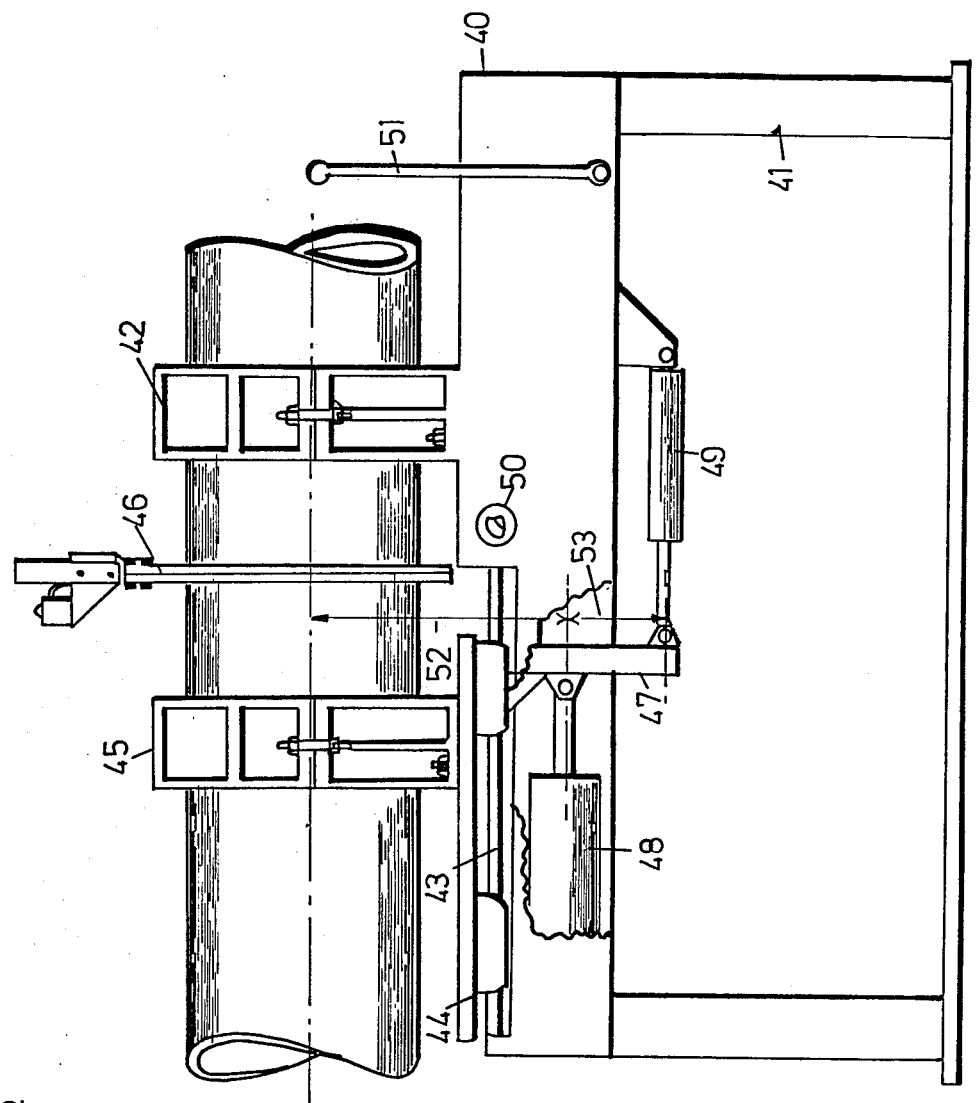

THERMOPLASTIC WELDING

BACKGROUND OF THE INVENTION

1. Field of the Invention

This invention relates to thermoplastic welding.

In the field of thermoplastic welding, there are a number of known and accepted methods of performing the joining of polyolefin and other thermoplastics based products. One such product which requires joining, is polyolefin based pipes and fittings, for example.

2. Description of the Prior Art

To perform the operation of welding or joining, it is desirable for machines to be employed which are adapted so as to bring the two surfaces to be welded together with a equal distribution of pressure on the join area. To effect this equal distribution of pressure, existing machines incorporate a number of hydraulic pistons which are so positioned around the product, for example the pipe or fitting as to bring equal pressure to bear on the jointed surfaces.

There are a number of disadvantages to having the hydraulic pistons positioned as stated above. A machine of this type unfortunately offers poor accessability, having the pistons situated in close proximity to the component to be welded. This inhibits the versatility of the machine, making it difficult or even impossible to join awkward shaped fittings.

Another known machine in common use, incorporates only one piston, which is mounted in such a way that it moves a slidably mounted bracket, which in turn brings the surfaces of the component to be joined or welded together. The disadvantage of this method is that there is a tendency, (which increases with wear), that equal pressure is not applied to the surfaces of the join, leading to an inherent weakness in the join. These machines are prone to wear in regions which aggravates this problem. However, this machine does have the advantage of being very versatile, not having the disadvantage of inaccessability due to the pistons mentioned in the previous machine.

SUMMARY OF THE INVENTION in the light of the above, it is apparent that there are advantages to be gained from a machine which offers both versatility and an equal distribution of pressure on the join area, resulting in a strong join or weld.

A thermoplastics welding machine in accordance with this invention comprises two sets of clamps adapted for clamping thermoplastic components to be welded, the two sets of clamps adapted to be linearly moveable with respect to one another, an action mechanism adapted to provide an action for pressing the two sets of clamps towards each other, the action being a force exerted on a line of action which is eccentric of the sets of clamps, and a reaction mechanism adapted to provide a reaction, the reaction being a reaction force exerted on a line of reaction which is eccentric of the set of clamps, adapted so as to balance a moment of force resulting from the eccentricity of the action with respect to the set of clamps.

The product of the reaction and the reaction eccentricity, (that is, eccentric distance from the set of clamps), must, for balance, be equal and opposite to the product of the action and the action eccentricity.

Preferably the reaction mechanism is adapted to provide a reaction with double, but opposite, the eccentricity of the action with respect to the sets of clamps, the reaction force being then half the magnitude of the action force.

This relationship between force magnitudes can be easily ensured by use of hydraulic piston-and-cylinder installations if they are exposed to the same hydraulic pressures and the cross sectional areas of the cylinders bear the ratio required for the reaction and action forces, e.g. one half to one mentioned above.

In a preferred form of the invention, one of the two clamps will be slidably mounted, the other rigidly mounted, so as to allow the two sets of clamps to be brought together. The movement and resultant pressure on the component surfaces would be supplied by the action mechanism, which preferably includes a hydraulic piston. However, to counteract the tendency toward applying eccentric force to the surfaces to be joined, reaction mechanism including an additional hydraulic piston is incorporated in a position where it provides a reaction force, thus balancing the moment of force arising from the eccentricity.

BRIEF DESCRIPTION OF THE DRAWINGS

The invention will now be more fully described with the aid of the accompanying drawings.

FIG. 6 is a front elevation of a machine in accordance with a preferred embodiment of the invention.

DESCRIPTION OF THE PREFERRED EMBODIMENT

Figure 1:
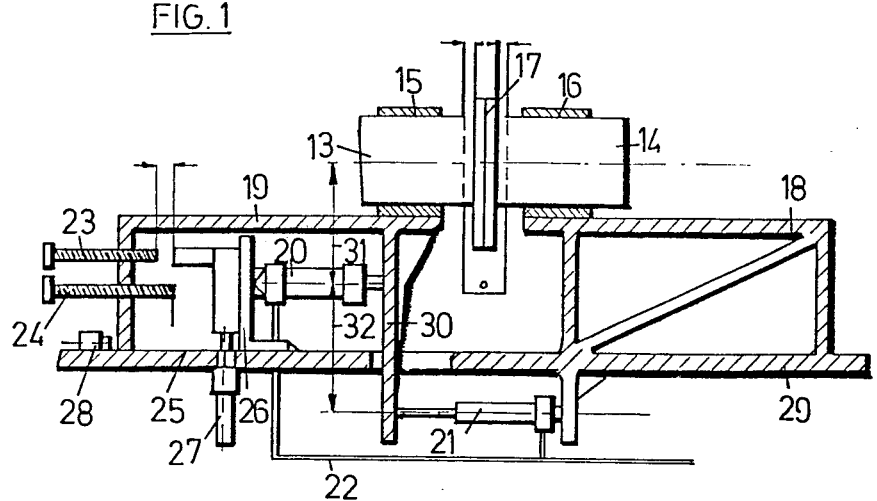
FIG. 1 shows a sectional elevational of the invention when it is about to be put into operation.

With reference to FIG. 1 numerals 13 and 14 indicate the two pieces of pipe to be joined. These pipes 13 and 14 are clamped in clamps 15 and 16. The pipes 13 and 14 are held flush against the heating element 17 by the clamps 15 and 16. The clamp 16 is rigidly mounted on the frame 18 and the clamp 15 is mounted on a sliding carriage 19. Hydraulic piston 20 is mounted in such a way that when actuated it exerts the pressure needed to move carriage 19 toward the stationary frame 18, hence causing pipe 13 to be pressed against heating element 17 which in turn exerts pressure against pipe 14. Hydraulic piston 21 is so situated so as to react to the eccentric component of the force exerted by piston 20. Numeral 22 shows the hydraulic fluid pipe that feeds pistons 20 and 21. Numerals 23 and 24 show stops attached to carriage 19. Pawl 25 is slidably attached to piston bracket 26. Numeral 27 represents the pawl cylinder which actuates the adjustments of the pawl 25. Carriage stop 28 is thus situated to limit travel of the carriage 19 to the left on frame base 29. Frame 18 and bracket 26 are fixed on the frame base 29 and carriage 19 with its bracket 30 is slidable on frame base 29. The operation of the invention will now be described with reference to FIG. 1, FIG. 2 and FIG. 3.

The pipes 13 and 14 are clamped in clamps 15 and 16, flush against heating element 17. The element 17 is then heated to a predetermined temperature. The hydraulic piston 20 exerts a prescribed force on the carriage 19 during the heating, which ensures that the pipes 13 and 14 are pressed against the heating element 17. The hydraulic piston 21 exerts a reaction force on bracket 30 which balances the turning moment arising from the eccentricity 31 of the line of action of the force of piston 20 from the surfaces of the pipes 13 and 14 which are pressed together.

Figure 4:
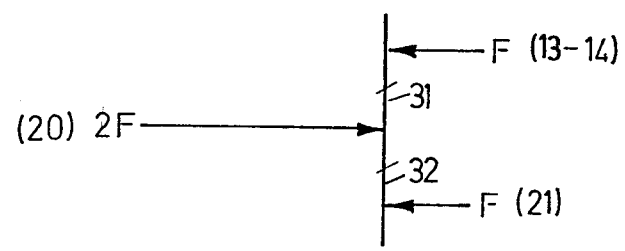
FIG. 4 shows a force diagram.

FIG. 4 shows the force balance achieved in accordance with this invention, in this example distance 32 is equal to distance 31, the eccentricity referred to above, so that the piston 21 exerts a force F equal to the total force F resulting from the pressure between the two surfaces being joined. The main piston 20 exerts a force 2F.

Distance "a" between pawl 25 and stop 23 sets the distance "a"/2 which the end of each of the two pipes 13 and 14 is compressed when the heating softens these ends.

Figure 2:
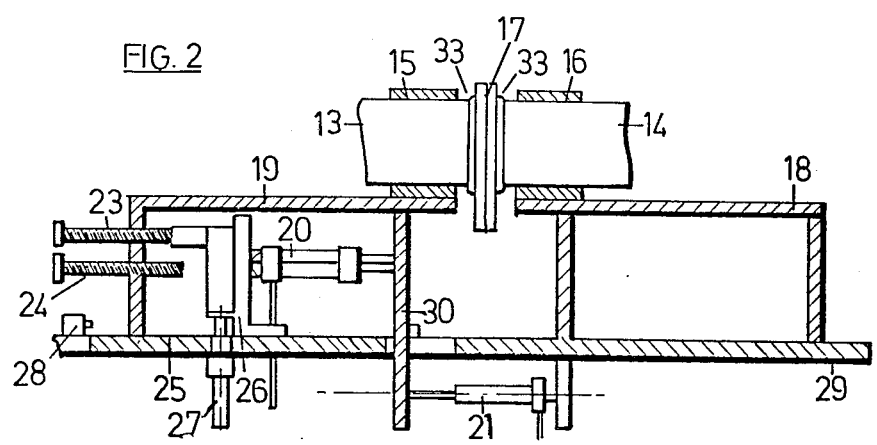
FIG. 2 shows a sectional elevation of an early stage of the operation of the invention.

FIG. 2 shows the end of the time of heating the pipe ends, when carriage 19 has been moved till the pawl 25 engages the stop 23 to limit further movement. This compresses the material of the pipes at their ends to form shoulders 33. The force of piston 20 is then released to allow removal of the heating pad 17 and cylinder 27 is actuated to move the pawl 25 to the position shown in FIG. 3, when the cylinder 20 is actuated again.

Distance "b" (see FIG. 1) between pawl 25 and stop 24 sets the distance, equal to (6-a-1), where "1"= the heater pad 17 thickness, by which the softened pipe ends with shoulders 33 are pressed together to form the joint.

Figure 3:
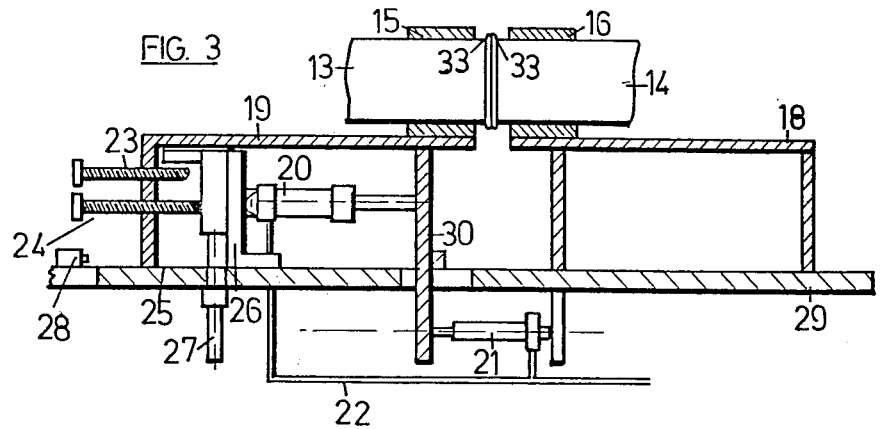
FIG. 3 is a sectional elevation showing the final stage of operation of the invention.

FIG. 3 shows the position reached when the carriage is further moved till pawl 25 engages stop 24, completing the weld. In this position sufficient time for cooling is allowed and then the joined pipes 13 and 14 may be unclamped from the machine.

Commencement of heating time occurs with the parts in the positions shown in FIG. 1, and end of heating time occurs with the parts in the position shown in FIG. 2. Welding occurs with the parts in the positions shown in FIG. 3, (in which the heating pad 17 has been removed.)

It will be apparent that throughout operation of cylinder 20, at whatever forces it exerts, when the pipes 13 and 14 are being pressed together, there is a force balance as shown in FIG. 4 including the moments of force.

FIG. 6 shows the invention applied to a machine of sightly different mechanical features. These are a base frame 40, standing on legs 41 on which frame a clamp 42 is fixed. (Clamp 42 can be swivelled to permit angle connections of pipes or substituted for by other clamps, e.g. for welding bends and tees to a pipe). On frame 40 a slide track 43 is provided for a carriage 44 which is thus slidably mounted. Clamp 45 is fixed on carriage 44 (also swiveably). A heating pad 46 is hand held and moved about, but can also be machine mounted. Carriage 44 has a depending bracket 47 against which a cylinder 48 provides the main action and cylinder 49 provides the balancing reaction. Gauge 50 can be calibrated to show the force applied to the surfaces to be joined and handle 51 controls forward, reverse and stopping of the carriage 44.

Figure 5:
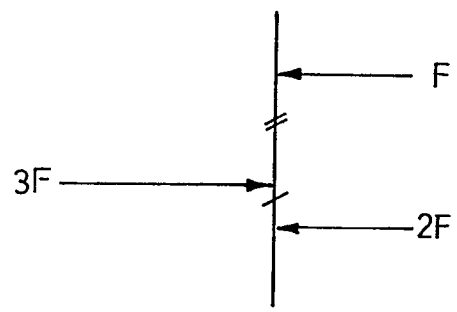
FIG. 5 shows an alternative force diagram.

By way of example, the kind of pressure required at weld surfaces of polyolefins and some copolymers such as acrylic butadiene stryene is from 100 kPa to 200 kPa. To join a 50 mm pipe having e.g. a 10 mm wall thickness, and thus a joint area of nearly $10^4$ mm$^2$, a force of 2 to 4 KN would be required. Assuming eccentricity 52 is twice the distance 53 between action and reaction pistons, FIG. 5 will show the balanced force diagram.

Thus cylinder 48 must exert a force, 3F, of 6 to 12 KN and cylinder 49, 2F, of 4 to 8 KN.

The principle of this invention is applicable to joining any thermoplastic components, and will be valuable where the attaining of an even pressure over the joined surfaces is required.

This invention can also be embodied in a set of parts as a kit for modifying an existing thermoplastic welding machine which has two sets of clamps adapted for clamping thermoplastic components to be welded, the two sets of clamps adapted to be linearly movable with respect to one another and an action mechanism adapted to provide an action for moving the two sets of clamps towards one another, which action comprises a force on a line of action which is eccentric of the components to be joined, the kit comprising a reaction mechanism adapted for attachment to the machine and to balance the moments of force resulting from the eccentricity, when in operation.

In principle it is not essential that, if for example the action mechanism includes a hydraulic cylinder, the reaction mechanism must include a hydraulic cylinder—mechanically equivalent devices satisfying the basic requirement of balanced forces and moments can be used within the scope of this invention.

I claim:

1. A machine for welding thermoplastic components which comprises two sets of clamps adapted for clamping thermoplastic components to be welded, the two sets of clamps adapted to be linearly moveable with respect to one another, an action mechanism adapted to provide an action for pressing the two sets of clamps towards each other, the action being a force exerted on a line of action which is eccentric of the sets of clamps, and a reaction mechanism adapted to provide a reaction, the reaction being a reaction force exerted on a line of reaction which is eccentric of the set of clamps, adapted, so as to balance a moment of force resulting from the eccentricity of the action with respect to the set of clamps, the product of the reaction and the reaction eccentricity being equal and opposite to the product of the action and the action eccentricity.

2. A machine as claimed in claim 1, in which the reaction mechanism is adapted to provide a reaction with the same, but opposite, eccentricity at the eccentricity of the action with respect to the sets of clamps, the reaction force being then half the magnitude of the action force.

3. A machine as claimed in claim 2, in which the action and reaction mechanisms comprise hydraulic piston-and-cylinder installations exposed to the same hydraulic pressures.

4. A machine as claimed in claim 1, in which one of the two clamps is slideably mounted, the other rigidly mounted, so as to allow the two sets of clamps to be brought together.

5. A machine as claimed in claim 1, which comprises a base, a clamp set rigidly mounted on the base, a slide track provided on the base, a clamp set fixed on a carriage which is slideably mounted on the slide track, a bracket fixed to and depending from the carriage, an action mechanism comprising a first hydraulic cylinder fixed to the base with a piston acting against the bracket, a reaction mechanism comprising a second smaller hydraulic cylinder fixed to the base with a piston acting against the bracket in a direction opposite to the direction of action of the first cylinder.

* * * * *